(12) United States Patent
Mori et al.

(10) Patent No.: US 11,486,328 B2
(45) Date of Patent: Nov. 1, 2022

(54) INJECTION CONTROL DEVICE

(71) Applicant: DENSO CORPORATION, Kariya (JP)

(72) Inventors: Tomoki Mori, Kariya (JP); Kosuke Kato, Kariya (JP); Hiroyuki Fukuda, Kariya (JP); Yohei Suganuma, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/473,706

(22) Filed: Sep. 13, 2021

(65) Prior Publication Data

US 2022/0082060 A1 Mar. 17, 2022

(30) Foreign Application Priority Data

Sep. 15, 2020 (JP) .............................. JP2020-154614

(51) Int. Cl.
*F02D 41/40* (2006.01)
*F02D 41/24* (2006.01)

(52) U.S. Cl.
CPC ....... *F02D 41/401* (2013.01); *F02D 41/2438* (2013.01); *F02D 2200/04* (2013.01); *F02D 2200/0614* (2013.01); *F02D 2200/0618* (2013.01); *F02D 2200/50* (2013.01)

(58) Field of Classification Search
CPC ............ F02D 2200/04; F02D 2200/50; F02D 41/2438; F02D 41/401
See application file for complete search history.

(56) References Cited

U.S. PATENT DOCUMENTS

| | | | | |
|---|---|---|---|---|
| 10,808,642 | B2* | 10/2020 | Satake | F02D 41/247 |
| 2015/0276919 | A1 | 10/2015 | Matsumura | |
| 2017/0282892 | A1* | 10/2017 | Endo | B60K 6/445 |
| 2019/0136789 | A1* | 5/2019 | Satake | F02M 51/0614 |
| 2019/0170075 | A1* | 6/2019 | Satake | F02D 41/401 |
| 2019/0203687 | A1* | 7/2019 | Yanoto | B05B 12/004 |
| 2020/0109680 | A1* | 4/2020 | Hashimoto | F02D 41/126 |
| 2022/0034277 | A1* | 2/2022 | Fukaya | F02D 41/401 |

\* cited by examiner

*Primary Examiner* — Carl C Staubach
(74) *Attorney, Agent, or Firm* — Posz Law Group, PLC

(57) ABSTRACT

An injection control device includes: an arithmetic unit that obtains a valve-closing time for stopping injection of fuel from a fuel injection valve based on a degree of variation in a time change of a voltage generated when the fuel injection valve is driven based on a required injection amount; an injection amount change unit that increases or decreases the required injection amount; and a learning unit that repeats injection control of the fuel to learn the valve-closing time obtained by the arithmetic unit.

7 Claims, 9 Drawing Sheets

INJECTION CONTROL DEVICE

CROSS REFERENCE TO RELATED APPLICATION

The present application claims the benefit of priority from Japanese Patent Application No. 2020-154614 filed on Sep. 15, 2020. The entire disclosure of the above application is incorporated herein by reference.

TECHNICAL FIELD

The present disclosure relates to an injection control device for controlling the opening and closing of a fuel injection valve.

BACKGROUND

The injection control device opens and closes a fuel injection valve to inject fuel into an internal combustion engine. A general fuel injection valve separates a valve element from an injection valve body having an injection hole for fuel and attaches the valve element to the injection valve body, thereby opening and closing the injection hole. The fuel injection valve incorporates a solenoid coil and electrically drives the solenoid coil to control the position of the valve element.

In the injection control device, when the energization of the solenoid coil is started or stopped, the valve element operates behind the energization start time or energization stop time. Thus, in order to accurately adjust the injection amount, it is necessary to adjust the energization time in consideration of the delay times. The delay time varies due to the use environment, aging deterioration, and individual variation of the fuel injection valve, variation in process, voltage, and temperature (PVT) of a component parameter such as a drive circuit for driving the fuel injection valve, and the like, and hence the valve-opening time and the valve-closing time of the valve element vary on the basis of various environmental changes described above. Therefore, a technique for estimating these timings has been provided.

When the valve-closing time is detected by using the differential method, correction is required so that a twice differential value coincides with the valve-closing time. Hence it is preferable to directly detect the valve-closing time by detecting the degree of variation such as a dispersion value. In a comparative technique, at least one of a voltage value or a current value of an electromagnetic coil is acquired as a sample value at a predetermined time interval during a sampling period set with a predetermined reference timing as a reference, and the start time or the completion time of the valve opening or closing is estimated on the basis of the calculation of the degree of variation in the sample value.

SUMMARY

An injection control device includes: an arithmetic unit that obtains a valve-closing time for stopping injection of fuel from a fuel injection valve based on a degree of variation in a time change of a voltage generated when the fuel injection valve is driven based on a required injection amount; an injection amount change unit that increases or decreases the required injection amount; and a learning unit that repeats injection control of the fuel to learn the valve-closing time obtained by the arithmetic unit.

BRIEF DESCRIPTION OF DRAWINGS

The above and other features and advantages of the present disclosure will be more clearly understood from the following detailed description with reference to the accompanying drawings. In the accompanying drawings.

DETAILED DESCRIPTION

For example, in the case of minute injection, it is difficult for the injection control device to detect the degree of variation in the sample value. When the degree of variation cannot be detected, the valve-closing time cannot be detected and learned, and the injection amount cannot be highly accurately corrected on the basis of the learned valve-closing time.

One example of the present disclosure provides an injection control device capable of reliably learning a valve-closing time.

According to one example embodiment, an injection control device drives a fuel injection valve to control the injection of fuel to an internal combustion engine. An arithmetic unit obtains a valve-closing time for stopping the injection of the fuel from the fuel injection valve based on a degree of variation in a time change of a voltage generated when the fuel injection valve is driven based on a required injection amount. An injection amount change unit increases or decreases the required injection amount. A learning unit repeats injection control of the fuel based on the required injection amount that is increased or decreased by the injection amount change unit, to learn the valve-closing time obtained by the arithmetic unit. As a result, it is possible to obtain the region of the required injection amount with which the degree of variation can be detected, calculate a range in which a valve-closing time can be learned, and learn the valve-closing time with high reliability.

Figure 1:
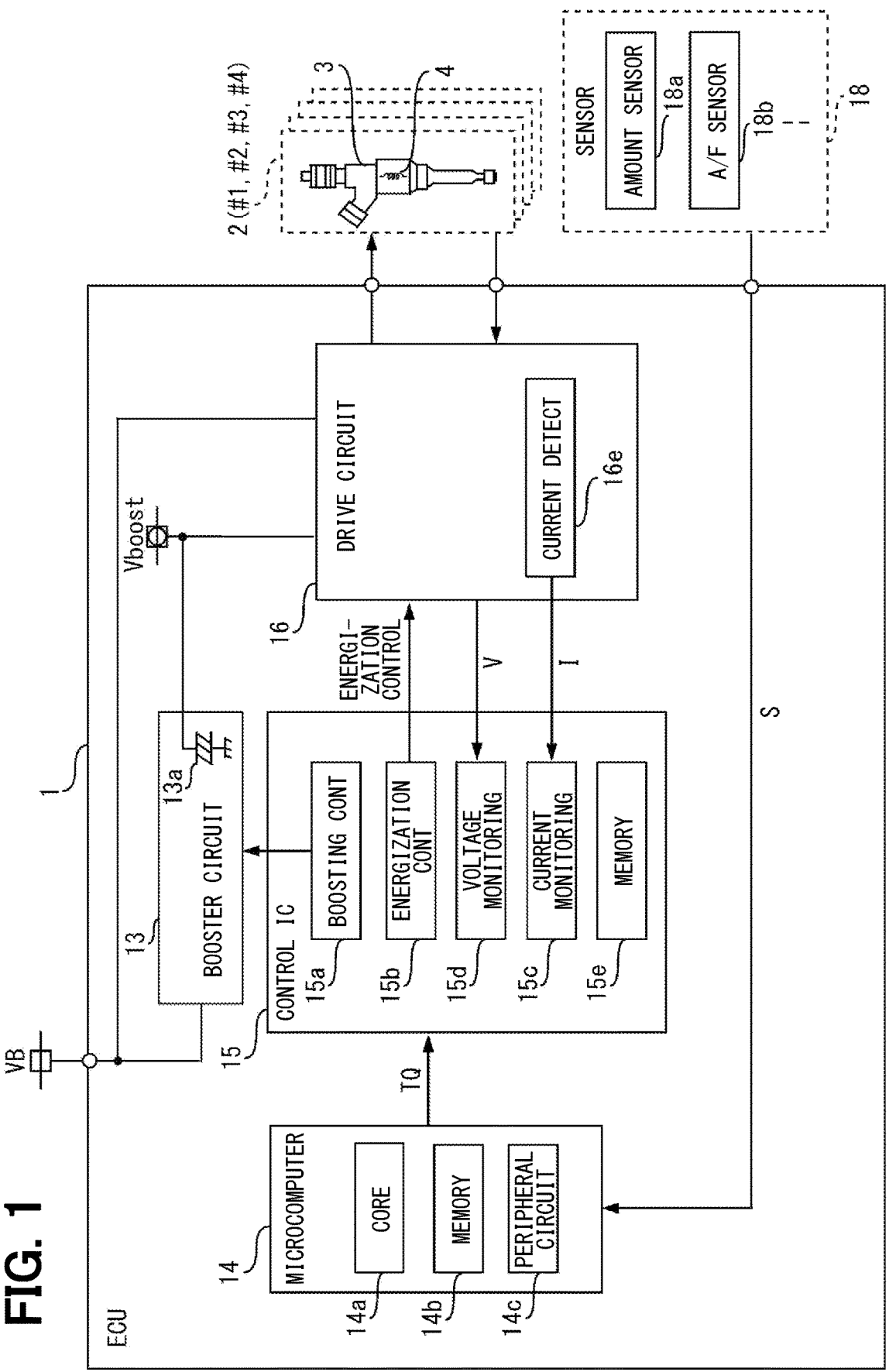
FIG. 1 is an electrical configuration of an injection control device according to an embodiment.

Hereinafter, an embodiment of an injection control device will be described with reference to the drawings. As illustrated in FIG. 1, an electronic control unit 1 (ECU) is configured as an injection control device for driving a solenoid type fuel injection valve 2 that directly injects and supplies fuel to an internal combustion engine mounted on a vehicle such as an automobile, for example. The fuel injection valve 2 is also referred to as an injector. In the following, a form in which the present disclosure is applied to an electronic control unit 1 for controlling a gasoline engine will be described, but the present disclosure may also be applied to an electronic control unit for controlling a diesel engine. The fuel injection valve 2 for four cylinders is illustrated in FIG. 1, but the present disclosure can also be applied to a three-cylinder engine, a six-cylinder engine, and an eight-cylinder engine.

Figure 2:
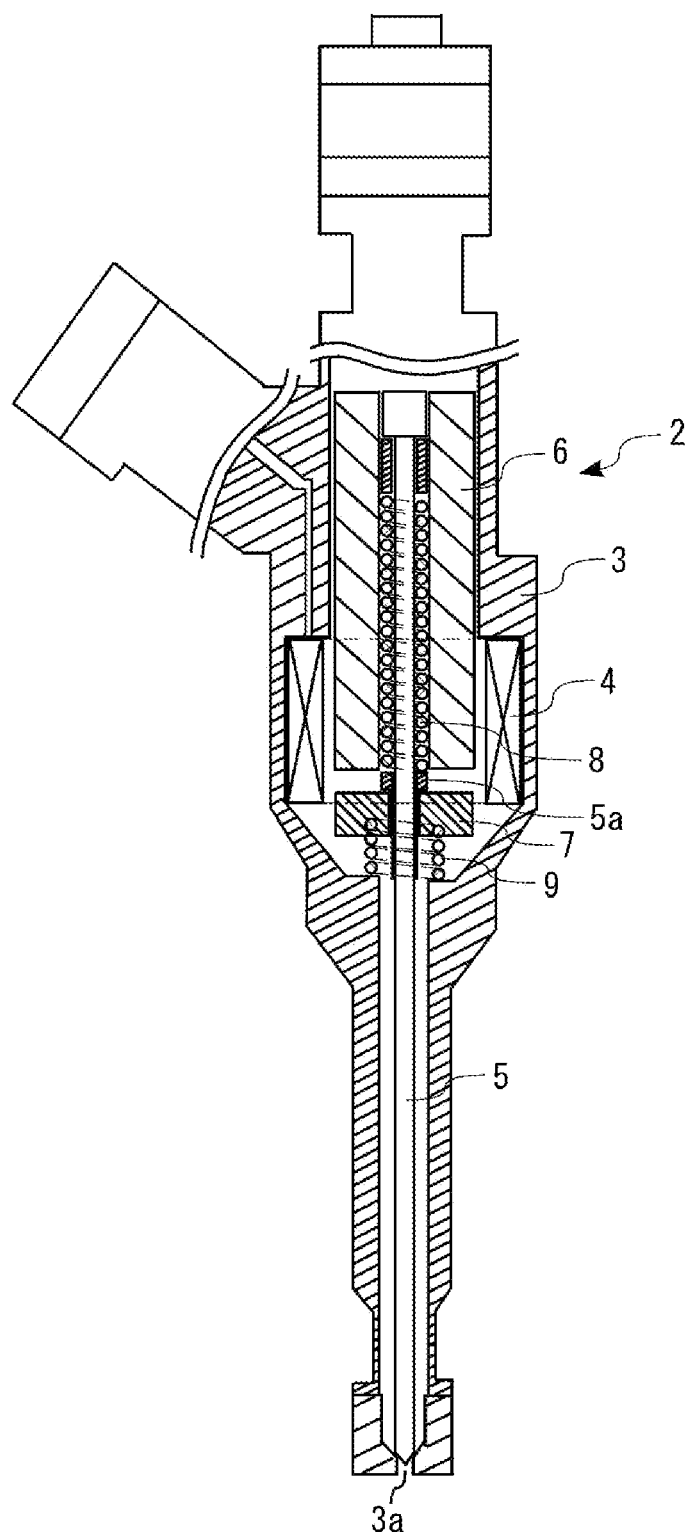
FIG. 2 is a longitudinal sectional side view schematically illustrating an internal structure of a fuel injection valve.

As illustrated in FIG. 2, the fuel injection valve 2 includes a solenoid coil 4, a valve element 5, a fixed core 6, and a movable core 7 in a body 3. The valve element 5 has a cylindrical shape as a whole and a conical shape on the tip side and is accommodated inside the body 3 so as to be movable forward in the axial direction. The body 3 is provided with a fuel injection hole 3a at the tip side of the valve element 5.

The fixed core 6 is fixed to the body 3. The fixed core 6 is formed of magnetic material in a cylindrical shape, and a fuel passage is formed inside the cylinder of the fixed core 6. The movable core 7 is provided inside the body 3 and around the valve element 5. The movable core 7 is formed in a disk shape using metallic magnetic material and is provided on the side of the injection hole 3a relative to the fixed core 6.

The movable core 7 is positioned inside the solenoid coil 4 and disposed so as to be movable forward in the axial direction. When the solenoid coil 4 is not energized, the movable core 7 is disposed facing the fixed core 6 so as to have a predetermined gap with the fixed core 6. A through hole is formed inside the movable core 7, the valve element 5 is inserted and disposed in the through hole, and the movable core 7 is in contact with a locking portion 5a of the valve element 5. The locking portion 5a is fixed to the valve element 5 and is formed between the movable core 7 and the fixed core 6, and when the movable core 7 operates toward the fixed core 6, the valve element 5 is interlocked via the locking portion 5a.

A first spring 8 is wound inside the fixed core 6 and around the valve element 5. The first spring 8 is disposed to apply an elastic force to the valve element 5 on the side of the injection hole 3a. A second spring 9 is positioned on the side of the injection hole 3a of the movable core 7 and fixed to the body 3. When the solenoid coil 4 is not energized, the second spring 9 holds the movable core 7 at the initial position.

When the energization of the solenoid coil 4 is started, the movable core 7 is attracted to the fixed core 6 against the elastic force of the second spring 9. When the movable core 7 operates, the valve element 5 operates in the axial direction via the locking portion 5a. Then, the movable core 7 comes into contact with the fixed core 6. Even when the movable core 7 is in contact with the fixed core 6, the locking portion 5a of the valve element 5 operates in the axial direction away from the movable core 7 and, whereby the valve element 5 is moved relative to the movable core 7. In the fuel injection valve 2, by the operation of the valve element 5, the tip side of the valve element 5 opens the injection hole 3a of the body 3 to inject fuel into the combustion chamber of the internal combustion engine When the energization of the solenoid coil 4 is stopped, the movable core 7 is returned to the initial position by the elastic force of the first spring 8 and the second spring 9. Thus, the tip side of the valve element 5 blocks the injection hole 3a of the body 3 to stop the fuel injection, and the fuel injection valve 2 is closed.

Next, an electrical configuration of the electronic control unit 1 will be described. As illustrated in FIG. 1, the electronic control unit 1 has an electrical configuration as a booster circuit 13, a microcomputer 14, a control integrated circuit (IC) 15, and a drive circuit 16.

The microcomputer 14 includes one or more cores 14a, a memory 14b such as read-only memory (ROM) and random-access memory (RAM), and a peripheral circuit 14c such as an analog-to-digital (A/D) converter, performs various kinds of control in parallel on the basis of application programs stored in the memory 14b and sensor signals S acquired from various sensors 18, and drives the fuel injection valve 2 with a current to control the injection of fuel to the combustion chamber of the internal combustion engine.

For example, the sensor 18 for a gasoline engine includes a crank angle sensor that outputs a pulse signal each time a crankshaft rotates at a predetermined angle, a fuel pressure sensor that detects fuel pressure during fuel injection, a throttle opening sensor that detects a throttle opening, an intake air temperature sensor that detects the temperature of intake air, a water temperature sensor that detects cooling water temperature, an intake air amount sensor 18a that detects the amount of intake air, an A/F sensor 18b that detects an air-fuel ratio, that is an A/F value, of the exhaust of the internal combustion engine, and some other sensor. FIG. 1 schematically illustrates the sensor 18.

The microcomputer 14 calculates the rotational speed of the internal combustion engine by using a pulse signal of the crank angle sensor and acquires a throttle opening from a throttle opening signal. The microcomputer 14 calculates a target torque required for the internal combustion engine on the basis of the throttle opening, hydraulic pressure, and the A/F value and calculates a target required injection amount on the basis of the target torque.

The microcomputer 14 calculates an energization command time Ti on the basis of the target required injection amount and the fuel pressure detected by the fuel pressure sensor and generates an injection command signal TQ. The microcomputer 14 calculates an injection start instruction time for each cylinder #1 to #4 on the basis of the sensor signals S input from the various sensors 18 and outputs the injection command signal TQ to the control IC 15 at the injection start instruction time.

The control IC 15 is, for example, an integrated circuit device using an application-specific integrated circuit (ASIC) and, although not illustrated, the control IC 15 includes a control body such as a logic circuit and a central processing unit (CPU), a memory 15e such as RAM, ROM, an erasable programmable read-only memory (EEPROM), comparator equipment using a comparator, and the like, for example, and is configured to perform various kinds of control on the basis of hardware and software. The control IC 15 has functions as a boosting control unit 15a, an energization control unit 15b, a current monitoring unit 15c, and a voltage monitor unit 15d. In the drawings, the boosting control unit 15a may be also referred to as BOOSTING CONT, the energization control unit 15b may be also referred to as ENERGIZATION CONT, the current monitoring unit 15c may be also referred to as CURRENT CONT, and the voltage monitor unit 15d may be also referred to as VOLTAGE MONITORING.

The booster circuit 13 includes a boosting type DC-to-DC converter. The booster circuit 13 receives input of a battery voltage VB to perform boost operation and charges a charge capacitor 13a serving as a charge unit with a boosting voltage Vboost.

The boosting control unit 15a controls the boosting of the battery voltage VB input into the booster circuit 13. The boosting control unit 15a detects the boosting voltage Vboost of the charge capacitor 13a of the booster circuit 13, performs charge with the detected boosting voltage Vboost to a fully charged voltage, and supplies the detected boosting voltage Vboost to the drive circuit 16.

Figure 3:
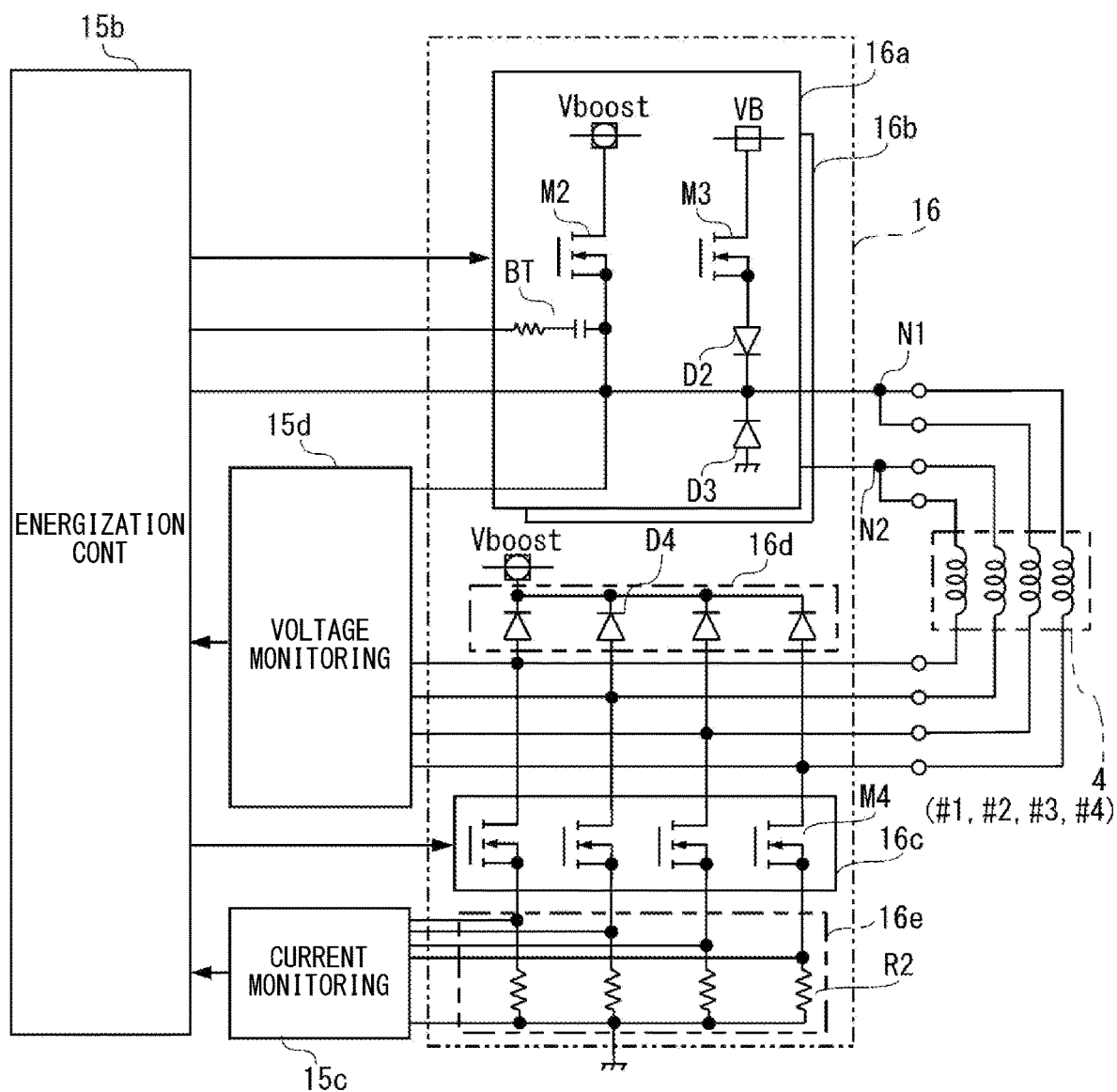
FIG. 3 is an electrical configuration of a drive circuit.

The drive circuit 16 receives the input of the battery voltage VB and the boosting voltage Vboost and operates. The drive circuit 16 applies a voltage to the solenoid coil 4 on the basis of the energization control of the energization control unit 15b of the control IC 15 to directly inject fuel from the fuel injection valve 2 to each cylinder #1 to #4. As illustrated in FIG. 3, the drive circuit 16 includes upstream circuits 16a, 16b connected upstream of the solenoid coil 4, a downstream circuit 16c connected downstream of the solenoid coil 4, and a current detection unit 16e. In the drawings, the current detection unit 16e may be also referred to as CURRENT DETECT.

The upstream side of the solenoid coils 4 for two cylinders is commonly connected at a node N1, and the upstream side of the solenoid coils 4 for the other two cylinders is commonly connected at a node N2. The upstream circuits 16a, 16b are connected to the nodes N1 and N2, respectively, so as to be energized and are connected so that a voltage can be applied to the fuel injection valves 2 for two cylinders, respectively. The upstream circuits 16a, 16b have the same configuration. Here, the configuration of the upstream circuit 16a will be described, and the configuration of the upstream circuit 16b will be omitted.

A drain-source of the MOSFET_M2 is connected between a supply node of the boosting voltage Vboost and the node N1. A boost circuit BT is connected to the source of the MOSFET_M2, and the supply capacity of the boosting voltage Vboost can be improved by the boost circuit BT. A drain-source of a MOSFET_M3 and an anode-cathode of a diode D2 are connected between a supply node of the battery voltage VB and the node N1. The diode D2 is provided to prevent the reverse flow of the boosting voltage Vboost.

Thus, when the energization control unit 15b turns on the MOSFET_M2, the boosting voltage Vboost can be applied to the solenoid coil 4 of the fuel injection valve 2 for two cylinders through the node N1. When the energization control unit 15b turns on the MOSFET_M3, the battery voltage VB can be applied to the solenoid coil 4 of the fuel injection valve 2 for two cylinders through the node N1. A reflux diode D3 is connected between the ground and the node N1.

On the other hand, the downstream circuit 6c is a cylinder selection switch for selecting the cylinders #1 to #4 to be injected with fuel and includes a MOSFET_M4. The energization control unit 15b can energize a desired solenoid coil 4 by turning on one or two MOSFETs_M4 at a desired timing. A regeneration circuit 16d is configured between the downstream side of the solenoid coil 4 and the supply node of the boosting voltage Vboost. The regeneration circuit 16d includes a diode D4 and can regenerate excess power, accumulated in the solenoid coil 4, in the charge capacitor 13a when the MOSFETs_M2 to M4 are turned off.

The current detection unit 16e includes a current detection resistor R2 for detecting the current flowing from the solenoid coil 4 through the downstream circuit 6c and is configured by being connected in series between the source of the MOSFET_M4 and the ground. Although not illustrated, the current monitoring unit 15c of the control IC 15 is configured using, for example, a comparison unit including comparator, an A/D converter, or the like and monitors, through the current detection unit 16e, a current flowing through the solenoid coil 4 of the fuel injection valve 2.

The voltage monitoring unit 15d of the control IC 15 is configured using an A/D converter (not illustrated), samples a terminal voltage on the downstream side of the solenoid coil 4, and stores the sampling data into the memory 15e. The terminal voltage on the upstream side of the solenoid coil 4 may also be sampled and stored into the memory 15e.

When the energization control unit 15b causes partial lift injection (minute injection) from the fuel injection valve 2, the energization control unit 15b turns on MOSFETs_M4 of the cylinders #1 to #4 to be injected and turns on MOSFETs_M2 to apply the boosting voltage Vboost to the solenoid coil 4 of the fuel injection valve 2 and performs processing to close the valve element 5 by turning off MOSFETs_M2, M4 before the lift of the valve element 5 ends completely.

When full lift injection (normal injection) is performed from the fuel injection valve 2, the energization control unit 15b turns on MOSFETs_M4 of the cylinders #1 to #4 to be injected through the drive circuit 16 and turns on MOSFETs_M2 to apply the boosting voltage Vboost to the solenoid coil 4, and then turns off MOSFETs_M2 and turns on/off MOSFETs_M3 to apply the battery voltage VB and perform constant current control, and when an energization command time Ti has elapsed, the energization control unit 15b turns off MOSFETs_M3, M4 to stop energization. Thus, at the time of full lift injection, after the lift of the valve element 5 ends completely, the processing of closing the valve element 5 is performed.

When the drive circuit 16 interrupts the energization current after energizing the solenoid coil 4 on the basis of the energization control of the energization control unit 15b of the control IC 15, a flyback voltage is generated in the solenoid coil 4. When the current of the solenoid coil 4 is interrupted, the valve element 5 and the movable core 7 are displaced in the valve-closing direction, so that an induced electromotive force based on the displacement of the valve element 5 and the movable core 7 is generated in the solenoid coil 4. Therefore, the flyback voltage and the induced electromotive voltage are superposed on the solenoid coil 4. The voltage monitoring unit 15d stores a sampling result, obtained by sampling the voltage generated in the solenoid coil 4, into the memory 15e.

Figure 4:
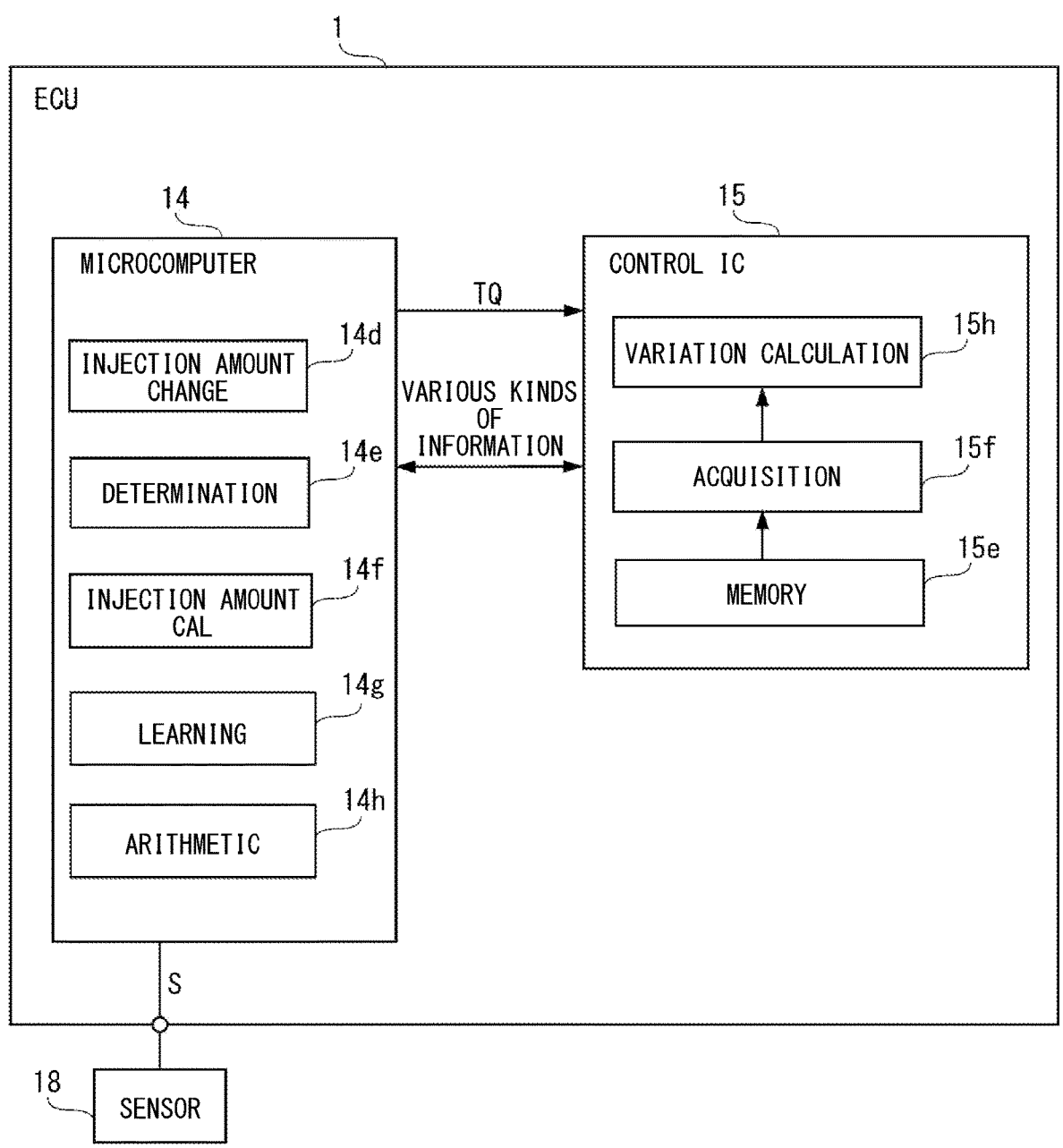
FIG. 4 is a functional configuration diagram of a microcomputer and a control IC.

As illustrated in FIG. 4, the microcomputer 14 has functions as an injection amount change unit 14d, a determination unit 14e, an injection amount calculation unit 14f, a learning unit 14g, and an arithmetic unit 14h. In the drawings, the injection amount change unit 14d may be also referred to as INJECTION AMOUNT CAL, the determination unit 14e may be also referred to as DETERMINATION, the injection amount calculation unit 14f may be also referred to as INJECTION AMOUNT CAL, the learning unit 14g may be also referred to as LEARNING, and the arithmetic unit 14h may be also referred to as ARITHMETIC. The injection amount change unit 14d has a function of increasing or decreasing the required injection amount by increasing or decreasing the energization command time Ti, for example. The injection amount change unit 14d desirably increases or decreases the required injection amount within a prescribed range in which it is determined that the travel and exhaust of the vehicle are not affected even when the required injection amount is changed on the basis of the determination result of the determination unit 14e. In particular, the microcomputer 14 desirably increases or decreases the required injection amount on the basis of the determination result of the determination unit 14e.

The determination unit 14e shows a function of determining the driving state of the vehicle. The driving state referred to here is, for example, a driving state determined on the basis of the amount of intake air detected by the intake air amount sensor 18*a*. When the vehicle is a predetermined vehicle such as a hybrid vehicle, the driving state indicates a mode state of an internal combustion engine traveling mode in which the vehicle travels using the internal combustion engine, an electric traveling mode in which the vehicle travels using an electric motor, and the like.

The control IC 15 also has functions as an acquisition unit 15*f* and a variation calculation unit 15*h*. In the drawings, the acquisition unit 15*f* may be also referred to as Acquisition, and the variation calculation unit 15*h* may be also referred to as VARIATION CALCULATION. The acquisition unit 15*f* of the control IC 15 has a function of acquiring sample data of a voltage, generated when the fuel injection valve 2 is driven, which is used in calculation processing of a dispersion value to be a degree of variation in the sampling data stored in the memory 15*e*. The variation calculation unit 15*h* calculates a dispersion value to be the degree of variation from the sample data of the voltage acquired by the acquisition unit 15*f*. The dispersion value is output to the microcomputer 14.

The microcomputer 14 has a function of estimating a valve-opening time and a valve-closing time (t2 to be described later) of the injection hole 3*a* based on the operation of the valve element 5. The microcomputer 14 repeats fuel injection control on the basis of the required injection amount increased or decreased by the injection amount change unit 14*d*. The arithmetic unit 14*h* obtains the valve-closing time t2 for stopping the injection of fuel from the fuel injection valve 2 on the basis of the dispersion value input from the control IC 15. The learning unit 14*g* learns the valve-closing time t2. Further, it is preferable that the injection amount calculation unit 14*f* calculate the maximum injection amount and the minimum injection amount of the required injection amount with which the valve-closing time t2 can be detected, and the learning unit 14*g* learn the valve-closing time t2 on the basis of the maximum injection amount and the minimum injection amount.

The control IC 15 has a function as a correction unit to receive the injection command signal TQ and corrects the energization command time Ti, thereby correcting the energization command time Ti so as to match an actual injection amount with a normal injection profile which is an ideal injection amount.

An operation according to the present embodiment will be described. Normally, the microcomputer 14 executes tasks related to various application programs in parallel, calculates the computing processing load of the microcomputer 14, and obtains parameters related to the state of the internal combustion engine and a drive parameter for driving the fuel injection valve 2 on the basis of the sensor signal S of the sensor 18. For example, on the basis of the sensor signals S of the various sensors 18, the microcomputer 14 determines the warm state of the internal combustion engine and determines whether the rotational speed of the internal combustion engine is higher than a predetermined rotational speed.

The microcomputer 14 transmits these various kinds of information to the control IC 15 together with an injection command signal TQ for single injection or multi-stage injection. Note that the information transmitted by the microcomputer 14 to the control IC 15 together with the injection command signal TQ may be the sensor signal S of the sensor 18 itself or may be a determination result determined on the basis of the sensor signal S of the sensor 18 or a signal representing another state.

Figure 5:
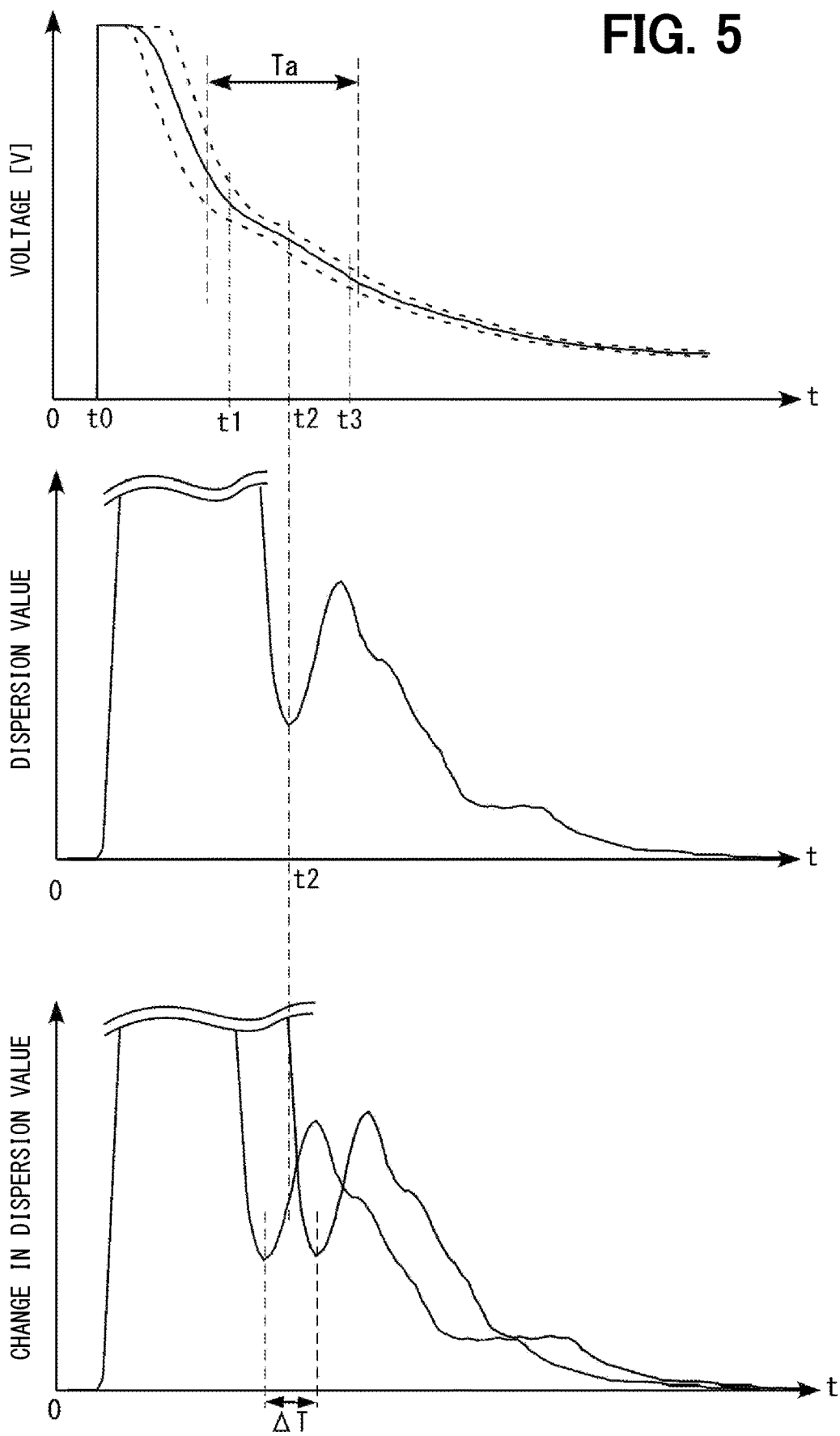
FIG. 5 is a diagram schematically illustrating a voltage change that occurs in a solenoid coil after de-energization.

FIG. 5 illustrates a change in the terminal voltage on the downstream side of the solenoid coil 4 detected by the voltage monitor unit 15*d* in response to the turning off the MOSFETs_M2 to M4 after the microcomputer 14 outputs the injection command signal TQ to the control IC 15 and the energization command time Ti elapses. The voltage monitoring unit 15*d* samples the terminal voltage on the downstream side of the solenoid coil 4 at a predetermined sampling interval during a predetermined period Ta including at least timing t1 and timing t2 (see below) after the energization end timing t0 and stores the sampling data of the voltage into the memory 15*e*.

When the energization current of the solenoid coil 4 is cut off after the lapse of the energization command time Ti, a flyback voltage is first generated in the solenoid coil 4. At this time, the terminal voltage on the downstream side of the solenoid coil 4 rapidly rises and then gradually drops to zero. The flyback voltage descends in a smooth curve projecting downward on the basis of a time constant determined by the circuit constants of the drive circuit 16 and the solenoid coil 4.

While the terminal voltage on the downstream side of the solenoid coil 4 gradually decreases to zero, the movable core 7 starts moving in the direction of closing the injection hole 3*a* together with the valve element 5 at timing t1 when a certain delay time has elapsed from the energization end timing t0. The delay time is a time determined on the basis of the internal structure of the fuel injection valve 2, that is, the relative positions of the fixed core 6 and the movable core 7, the weight of the movable core 7, the elastic forces of the first spring 8 and the second spring 9, and the like.

When the valve element 5 and the movable core 7 start to move, an induced electromotive force based on the movement of the valve element 5 and the movable core 7 is generated in the solenoid coil 4, so that the terminal voltage on the downstream side of the solenoid coil 4 rises more than the downward curve projecting downward as shown in timing t1 to timing t2. At the valve-closing time t2 when the valve element 5 closes the injection hole 3*a*, the moving speed of the movable core 7 becomes maximum, but since the valve element 5 is seated to close the injection hole 3*a*, the movable core 7 decelerates rapidly. At this time, the induced electromotive force having been generated in the solenoid coil 4 also changes rapidly, so that an inflection point appears in the terminal voltage. Thereafter, the movable core 7 moves to the injection hole 3*a* side away from the locking portion 5*a* of the valve element 5, the induced electromotive voltage continues to be generated until a timing after the valve-closing time t2, for example, t3.

As described above, the voltage monitor unit 15*d* holds the sampling data in the memory 15*e* at a predetermined sampling interval for at least a predetermined period Ta including the timings t1 to t2. Thus, the sampling data can be utilized for the analysis processing of the valve-closing time t2.

For example, it is possible to calculate the inflection point of the terminal voltage of the solenoid coil 4 by differentiating the sampling data by time. However, it has been found that, in a case where this differentiation method is used, the smoothing effect of the sampling data becomes greater when the sampling data is increased. Further, it has been found that, due to the increase in the smoothing effect, a Q value of the amount of change in a differential value decreases, and a signal-to-noise ratio (S/N) deteriorates.

Therefore, as illustrated in FIG. 5, it is preferable to calculate the valve-closing time t2 by calculating the dispersion value representing the degree of variation in the sampling data that changes with time to obtain the inflection point of the terminal voltage on the downstream side of the solenoid coil 4. It is preferable that the amount of change in the dispersion value of the sample data be calculated and that the timing at which the amount of change is zero-crossed be specified as the valve-closing time t2.

The amount of change in voltage caused by the change in the induced electromotive force is very small even in full lift injection. In particular, in the case of the partial lift injection, a change in the moving speed of the movable core 7 at the point in time of sitting becomes small due to the small lift amount at the start of the valve-closing operation, and the amount of change in the induced electromotive voltage becomes particularly small. When the inflection point cannot be detected, the valve-closing time t2 cannot be detected, so that the valve-closing time t2 cannot be learned, and the required injection amount cannot be corrected.

Figure 6:
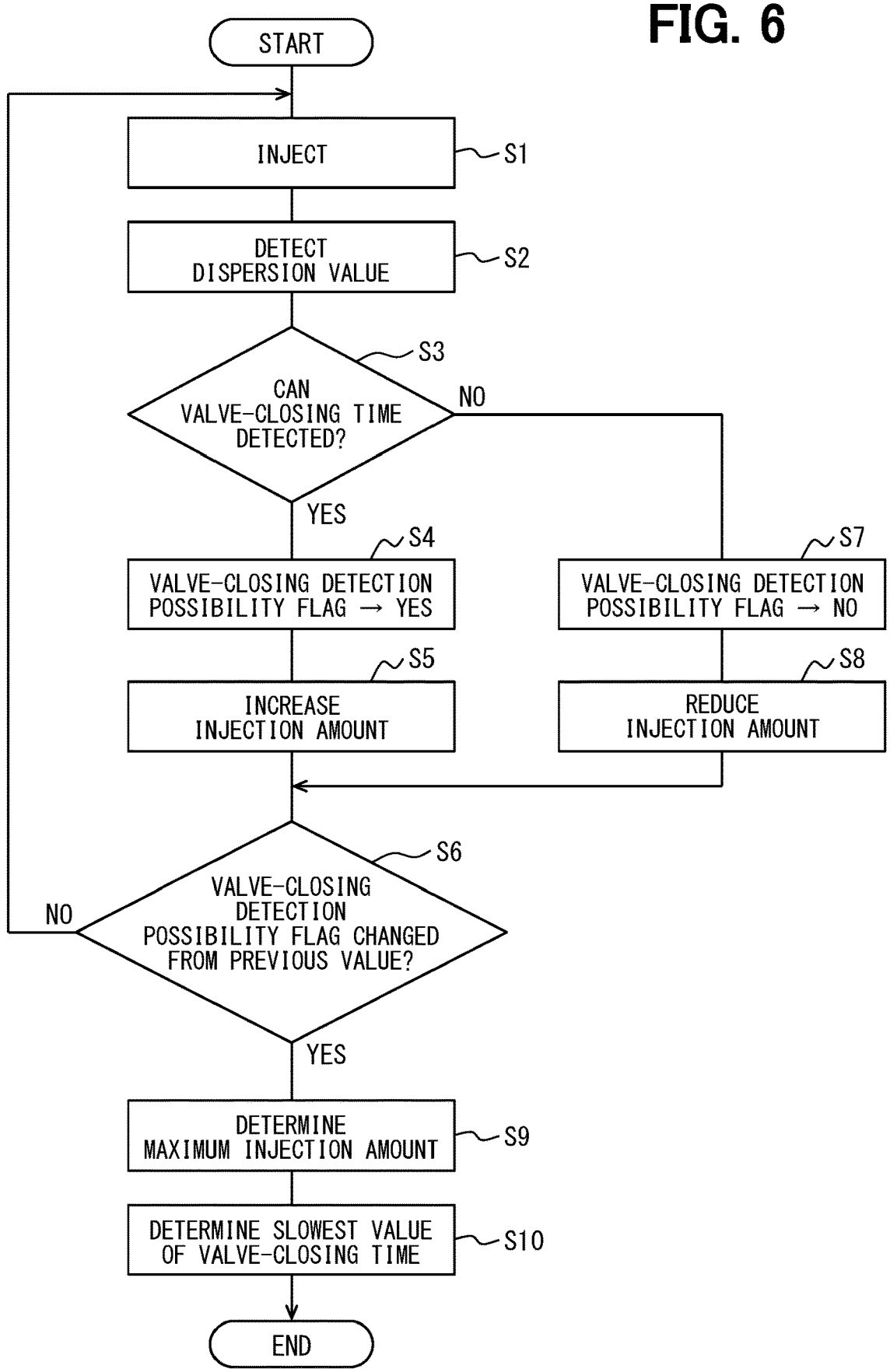
FIG. 6 is a flowchart schematically illustrating a flow for obtaining a region in which the degree of variation is detectable.
Figure 9:
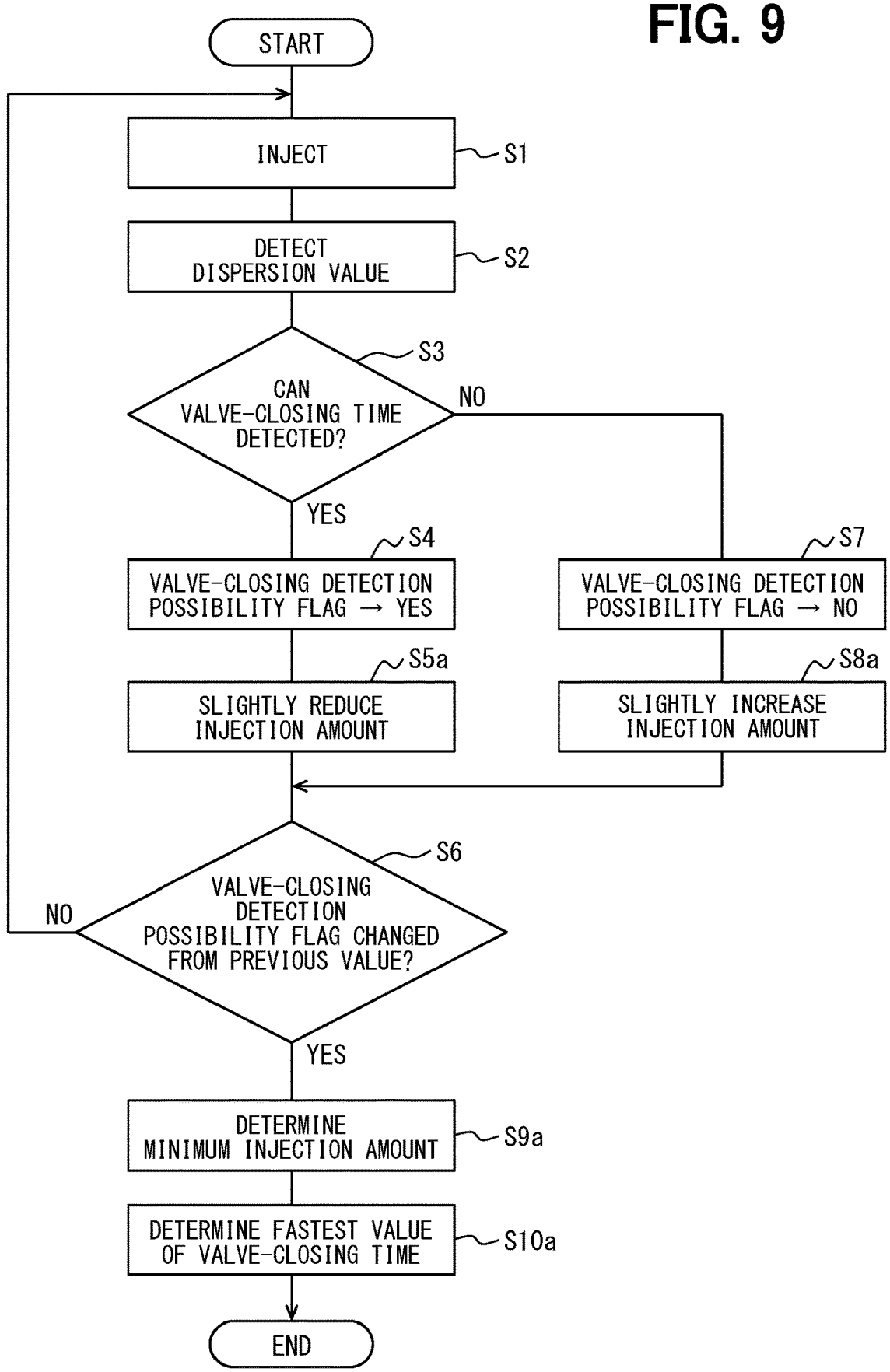
FIG. 9 is a timing chart schematically illustrating a flow for obtaining a region in which the degree of variation is detectable.

Therefore, it is preferable that the microcomputer 14 repeat the fuel injection control on the basis of the required injection amount, increased or decreased by the injection amount change unit 14*d*, and learn the valve-closing time t2 by the learning unit 14*g*. In particular, as illustrated in FIGS. 6 and 9, it is desirable that the microcomputer 14 calculate the maximum injection amount and the minimum injection amount of the required injection amount, with which the valve-closing time t2 can be detected by the injection amount calculation unit 14*f*, and learn the valve-closing time t2 in the range of the maximum injection amount and the minimum injection amount.

A specific example will be described. For example, when the control IC 15 detects the dispersion value each time one injection is made in S1 and S2 of FIG. 6 and outputs the dispersion value to the microcomputer 14, and the microcomputer 14 determines that the valve closing can be detected in S3 of FIG. 6, the microcomputer 14 sets a valve-closing detection possibility flag to Yes in S4, and changes the required injection amount to slightly increase in S5.

Figure 7:
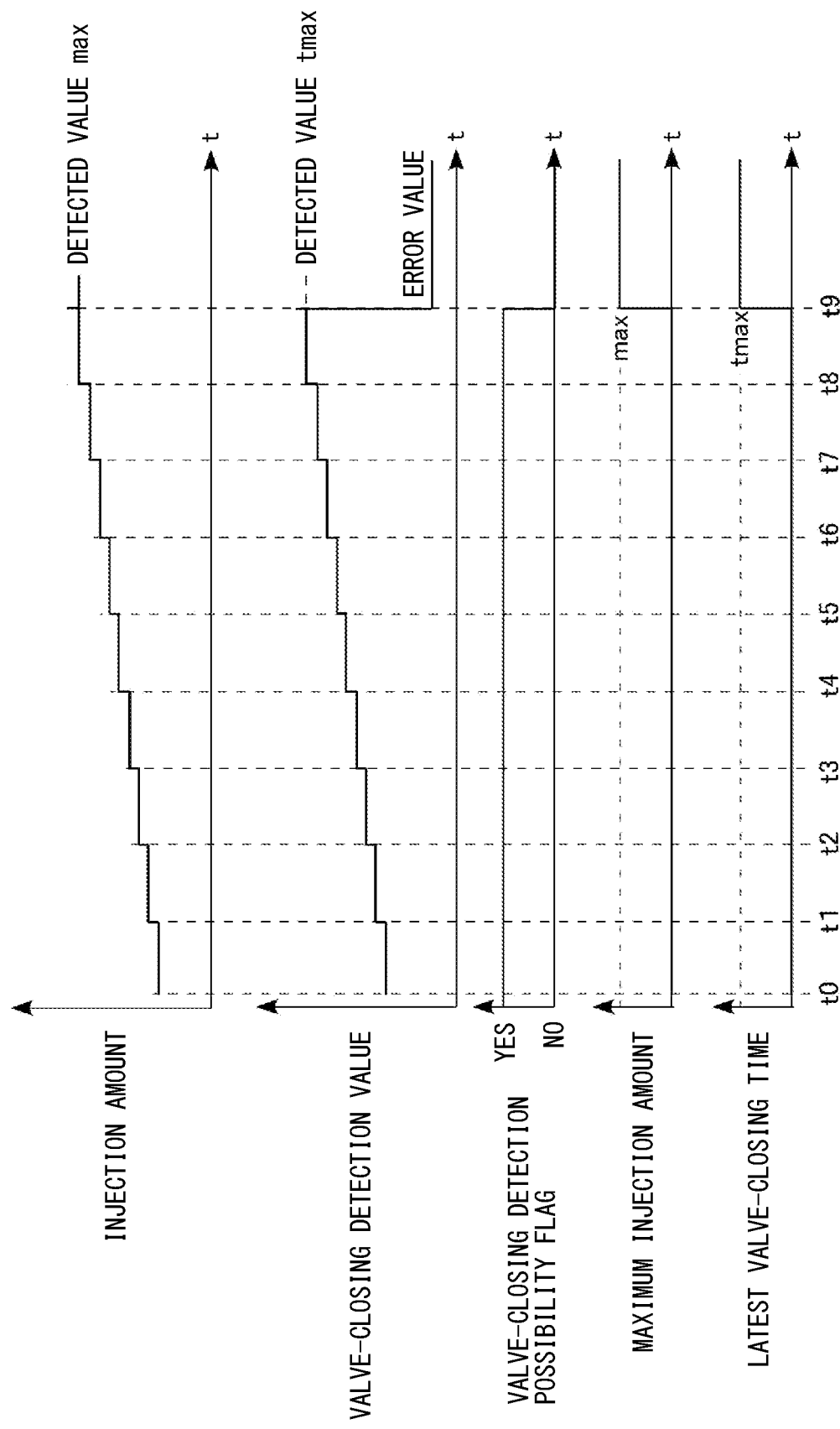
FIG. 7 is a timing chart (first part) schematically illustrating a flow for obtaining a region in which the degree of variation is detectable.

As illustrated in FIG. 7, when the required injection amount is set to be large, the valve-closing time t2 is delayed, and when the required injection amount is set to be small, the valve-closing time t2 becomes early. At this time, as shown by timing t0 to timing t8 in FIG. 7, while it is determined that the valve closing can be detected, the microcomputer 14 slightly increases the required injection amount stepwise by the injection amount change unit 14*d*.

At timing t9 in FIG. 7, when the microcomputer 14 slightly increases the required injection amount by the injection amount change unit 14*d*, the microcomputer 14 determines that the valve-closing detection is impossible by acquiring an error value as the valve-closing detection value in S3, sets the valve-closing detection possibility flag to No in S7, and slightly reduces the required injection amount in S8.

Figure 8:
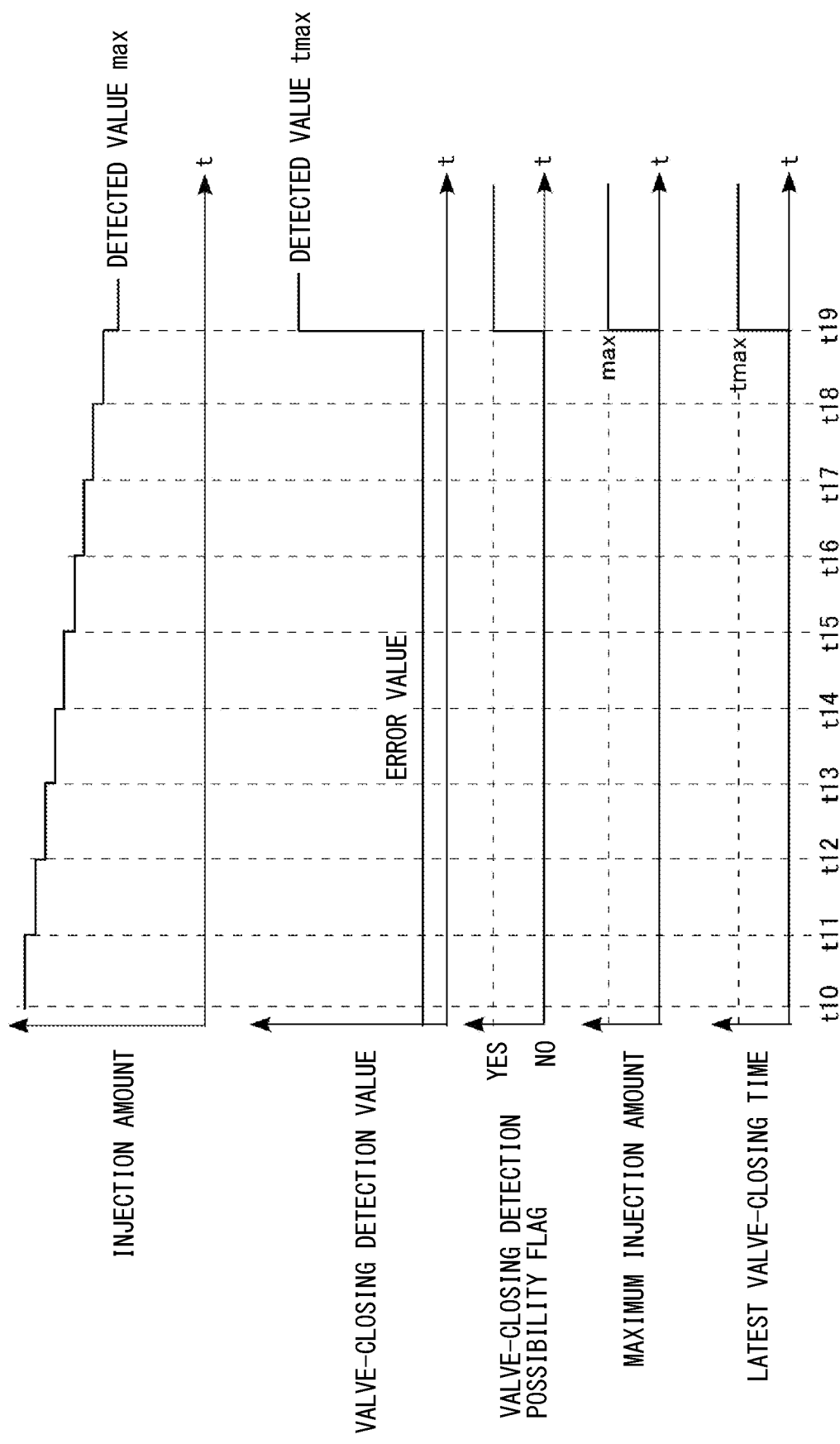
FIG. 8 is a timing chart (second part) schematically illustrating a flow for obtaining a region in which the degree of variation is detectable.

When detecting in S6 of FIG. 6 that the valve-closing detection possibility flag has changed from the previous value, that is, the valve-closing detection possibility flag has changed from Yes to No, the microcomputer 14 determines a maximum injection amount max in S9 and determines a slowest value tmax of the valve-closing time t2 in S10. Thus, by detecting the boundary which transitions from the valve-closing detectable state to the valve-closing undetectable state at timing t9 in FIG. 7, the maximum injection amount max can be determined, and the slowest value tmax of the valve-closing time t2 can be determined On the other hand, for example, when the control IC 15 detects the dispersion value each time the injection is made in S1 and S2 of FIG. 6, and the microcomputer 14 determines that the valve-closing detection is impossible by acquiring an error value as the valve-closing detection value in S3 of FIG. 6, the microcomputer 14 sets the valve-closing detection possibility flag to No in S7 and slightly reduces the required injection amount in S8. At this time, as shown by timing t10 to timing t18 in FIG. 8, while it is determined that the valve closing cannot be detected, the microcomputer 14 slightly reduces the required injection amount in a stepwise manner by the injection amount change unit 14*d*.

When detecting in S6 of FIG. 6 that the valve-closing detection possibility flag has changed from the previous value, that is, the valve-closing detection possibility flag has changed from No to Yes, the microcomputer 14 determines the maximum injection amount max in S9 and determines the slowest value tmax of the valve-closing time t2 in S10. Thus, also by detecting the boundary which transitions from the valve-closing undetectable state to the valve-closing detectable state at timing t19 in FIG. 8, the maximum injection amount max can be determined, and the slowest value tmax of the valve-closing time t2 can be determined For example, conversely, when the control IC 15 detects the dispersion value each time one injection is made in S1 and S2 of FIG. 9, and the microcomputer 14 determines that the valve closing can be detected in S3 of FIG. 9, the microcomputer 14 sets a valve-closing detection possibility flag to Yes in S4, and changes the required injection amount to slightly decrease in S5*a*.

When the microcomputer 14 continues to slightly reduce the required injection amount by the injection amount change unit 14*d* while the valve-closing detection is possible, the microcomputer 14 eventually acquires an error value as the valve-closing detection value in S3. Then, the microcomputer 14 determines that the valve-closing detection is impossible, sets the valve-closing detection possibility flag to NO in S7, and slightly increases the required injection amount in S8*a*.

When detecting in S6 of FIG. 9 that the valve-closing detection possibility flag has changed from the previous value, that is, the valve-closing detection possibility flag has changed from Yes to No, the microcomputer 14 determines the minimum injection amount in S9*a* and determines the fastest value of the valve-closing time t2 in S10*a*. Thus, by detecting the boundary which transitions from the valve closing detectable state to the valve closing undetectable state, the fastest value of the valve-closing time t2 can be determined while the minimum injection amount is detected.

On the other hand, for example, when the control IC 15 detects the dispersion value each time the injection is made in S1 and S2 of FIG. 9, and the microcomputer 14 determines that the valve-closing detection is impossible by acquiring an error value as the valve-closing detection value in S3 of FIG. 9, the microcomputer 14 sets the valve-closing detection possibility flag to No in S7 and slightly increases the required injection amount in S8*a*. While it is determined that the valve-closing detection is impossible, the microcomputer 14 slightly increases the required injection amount in a stepwise manner by the injection amount change unit 14*d*.

When detecting in S6 of FIG. 9 that the valve-closing detection possibility flag has changed from the previous value, that is, the valve-closing detection possibility flag has changed from No to Yes, the microcomputer 14 determines the minimum injection amount in S9*a* and determines the fastest value of the valve-closing time t2 in S10*a*. Thus, also by detecting the transition boundary between the valve closing detectable state and the valve closing undetectable state, the fastest value of the valve-closing time t2 can be determined while the minimum injection amount is detected.

Thereafter, the microcomputer 14 outputs the injection command signal TQ to the control IC 15 so as to increase or decrease the required injection amount by the injection amount change unit 14*d* within the range of the obtained maximum injection amount and minimum injection amount and learns the valve-closing time t2 on the basis of the dispersion value calculated by the control IC 15 for each of these injections. As a result, the valve-closing time t2 can be learned with high reliability.

By storing the detected valve-closing time t2 into the memory 14*b*, the microcomputer 14 can learn the relationship between the required injection amount within the range of the maximum injection amount and the minimum injection amount and the detection result of the valve-closing time t2. The valve-closing time t2 according to a standard product is predetermined, so that the microcomputer 14 can compare the standard value with the detected valve-closing time t2 to learn the deviation. The microcomputer 14 can correct the required injection amount by using the learned value to realize injection accuracy satisfying the emission requirement.

The microcomputer 14 desirably increases or decreases the required injection amount within a prescribed range in which it is determined that the travel and exhaust of the vehicle are not affected even when the required injection amount is changed on the basis of the determination result of the determination unit 14*e* that determines the driving state of the vehicle by the function of the injection amount change unit 14*d*. The driving state of the vehicle determined by the determination unit 14*e* is the driving states of various vehicles determined on the basis of the sensor signals S of the sensors 18 and indicates, for example, an amount of intake air detected by the intake air amount sensor 18*a*, an A/F value detected by the A/F sensor 18*b*, a driving mode in the case of a predetermined vehicle such as a hybrid vehicle, that is, an internal combustion engine traveling mode in which the vehicle is traveling using the internal combustion engine, an electric traveling mode in which the vehicle travels using an electric motor, and the like.

In this case, it is desirable to learn the valve-closing time t2 on the condition that the amount of intake air detected by the intake air amount sensor 18*a* is greater than a predetermined value. This is because when the amount of intake air is greater than the predetermined amount, there is little possibility of affecting the traveling state. When the vehicle is a predetermined vehicle such as a hybrid vehicle having an internal combustion engine traveling mode in which the vehicle travels using an internal combustion engine and an electric traveling mode in which the vehicle travels using an electric motor, it is desirable to learn the valve-closing time t2 in the electric traveling mode. This is because the traveling control of the electronic control unit 1 is not affected in the electric traveling mode.

In addition, when the present disclosure is applied to a multi-stage injection in which other injections are continuously performed before or after the main injection, it is desirable to learn the valve-closing time t2 by increasing or decreasing the required injection amount of one or more injections determined to have no effect on the traveling and exhaust of the vehicle, among the multi-stage injections. When it is determined that the injection control function has no effect on the traveling control or the exhaust, the learning function may be activated at any timing.

As described above, according to the present embodiment, the microcomputer 14 repeats the fuel injection control on the basis of the required injection amount increased or decreased by the injection amount change unit 14*d*, so that the valve-closing time t2 determined on the basis of the dispersion value is learned by the learning unit 14*g*. As a result, the valve-closing time t2 can be learned with high reliability. In particular, it is preferable that the microcomputer 14 calculate the maximum injection amount and the minimum injection amount of the required injection amount, with which the valve-closing time t2 can be detected by the injection amount calculation unit 14*f*, and learn the valve-closing time t2 in the range of the maximum injection amount and the minimum injection amount.

Other Embodiments

The present disclosure is not limited to the embodiment described above but can be implemented in various variations and can be applied to various embodiments without departing from the gist thereof. For example, the following modifications or extensions are possible.

The embodiment has been described in which the microcomputer 14 is provided with the functions as the injection amount change unit 14*d*, the determination unit 14*e*, the injection amount calculation unit 14*f*, the learning unit 14*g*, and the arithmetic unit 14*h*, and the control IC 15 is provided with the functions as the acquisition unit 15*f* and the variation calculation unit 15*h*. However, these functions may be provided in either the microcomputer 14 or the control IC.

Although it has been that the microcomputer 14 and the control IC 15 are configured using separate integrated circuits, the microcomputer 14 and the control IC 15 may be configured integrally. In the case of the integrated configuration, it is preferable to use a high-speed processing device for the configuration.

In the embodiment described above, the present disclosure has been applied to in-cylinder injection in which the injection is directly made into the combustion chamber of the internal combustion engine. However, the present disclosure is not limited thereto and may be applied to port injection in which fuel is injected in front of an intake valve. The present embodiment is not limited to the in-cylinder injection in which the injection is directly made into the combustion chamber of the internal combustion engine. It has been described in an easy-to-understanding manner that the body 3 of the fuel injection valve 2 is configured using one member, but the present disclosure is not limited thereto.

In the embodiment described above, the form has been shown in which the terminal voltage on the downstream side of the solenoid coil 4 is acquired in order to detect the valve-closing time t2, but the voltage node to be acquired is not limited to the downstream side of the solenoid coil 4. The circuit configuration of the drive circuit 16 is not limited to the configuration described above. The form in which the calculation is made using the dispersion value as the degree of variation has been shown, but the present disclosure is not limited to this. The degree of variation may be changed so as to obtain the square of an expected value, or the degree of variation may be calculated by acquiring an absolute value of a value obtained by subtracting an average value from the sample data, adding all these values, and then performing the square. Thus, the number of times of multiplication can be reduced, and the arithmetic processing load can be reduced.

The method using the microcomputer 14 and the control IC 15 according to the present disclosure may be achieved by a dedicated computer including a processor and a memory programmed to execute one or more functions embodied by a computer program. Alternatively, the control device and the method according to the present disclosure may be achieved by a dedicated computer including a processor with one or more dedicated hardware logic circuits. Alternatively, the control method and the method according to the present disclosure may be achieved using one or more dedicated computers including a combination of the processor and the memory programmed to execute one or more functions and the processor with one or more hardware logic circuits. The computer program may be stored in a computer-readable non-transitory tangible storage medium as an instruction to be executed by the computer.

The numerals in parentheses in the claims indicate correspondence with the specific means according to the embodiment described above as one aspect of the present disclosure and do not limit the technical scope of the present disclosure. An aspect in which a part of the embodiment described above is omitted so far as the difficulty can be solved can also be regarded as an embodiment. Any aspects conceivable within the nature of the invention specified by wordings described in claims can also be regarded as embodiments.

Although the present disclosure has been described in accordance with the above embodiment, it is understood that the present disclosure is not limited to the embodiment or structure. The present disclosure also encompasses various modified examples and modifications within a uniform range. In addition, various combinations and forms, as well as other combinations and forms including only one element, more than that, or less than that, are also within the scope and idea of the present disclosure.

Here, the process of the flowchart or the flowchart described in this application includes a plurality of sections (or steps), and each section is expressed as, for example, S1. Further, each section may be divided into several subsections, while several sections may be combined into one section. Furthermore, each section thus configured may be referred to as a device, module, or means.

The invention claimed is:

1. An injection control device for controlling injection of the fuel to an internal combustion engine by driving a fuel injection valve to cause a vehicle to travel, the injection control device comprising:
    an arithmetic unit configured to obtain a valve-closing time for stopping the injection of the fuel from the fuel injection valve based on a degree of variation in a time change of a voltage generated when the fuel injection valve is driven based on a required injection amount;
    an injection amount change unit configured to increase or decrease the required injection amount; and
    a learning unit configured to repeat injection control of the fuel based on the required injection amount that is increased or decreased by the injection amount change unit, to learn the valve-closing time obtained by the arithmetic unit,
    wherein
    the arithmetic unit further determines whether the valve-closing time is detectable,
    in response to determining that the valve-closing time is detectable, the arithmetic unit increases the required injection amount, and
    in response to determining that the valve-closing time is not detectable, the arithmetic unit decreases the required injection amount.

2. The injection control device according to claim 1, further comprising:
    an injection amount calculation unit configured to calculate a maximum injection amount and a minimum injection amount of the required injection amount with which the valve-closing time is detectable,
    wherein:
    the learning unit is configured to learn the valve-closing time by the injection amount change unit increasing or decreasing the required injection amount within a range between the maximum injection amount and the minimum injection amount.

3. The injection control device according to claim 1, further comprising:
    a determination unit configured to determine a driving state of the vehicle,
    wherein:
    the injection amount change unit is configured to increase or decrease the required injection amount within a prescribed range in which it is determined that traveling and exhaust of the vehicle are not affected even when the required injection amount is changed based on a determination result of the determination unit.

4. The injection control device according to claim 1, wherein:
    on a condition that an intake amount of air sucked into the internal combustion engine is greater than a predetermined amount, the injection amount change unit increases or decreases the required injection amount and the learning unit learns the valve-closing time.

5. The injection control device according to claim 1, wherein:
    the vehicle is a predetermined vehicle having an internal combustion engine traveling mode in which the vehicle travels using the internal combustion engine and an electric traveling mode in which the vehicle travels using an electric motor; and
    on a condition that the vehicle is in the electric traveling mode, the injection amount change unit increases or decreases the required injection amount and the learning unit learns the valve-closing time.

6. The injection control device according to claim 1, wherein:
    the injection amount change unit is configured to increase or decrease the injection amount for a part of multi-stage injection.

7. An injection control device for controlling injection of the fuel to an internal combustion engine by driving a fuel injection valve to cause a vehicle to travel, the injection control device comprising:
    one or more processors; and
    a memory coupled to the one or more processors and storing program instructions that when executed by the one or more processors cause the one or more processors to at least:
        obtain a valve-closing time for stopping the injection of the fuel from the fuel injection valve based on a degree of variation in a time change of a voltage generated when the fuel injection valve is driven based on a required injection amount;
        increase or decrease the required injection amount;
        repeat injection control of the fuel based on the required injection amount that is increased or decreased to learn the valve-closing time that is obtained,
        determine whether the valve-closing time is detectable;
        in response to determining that the valve-closing time is detectable, increase the required injection amount; and in response to determining that the valve-closing time is not detectable, decrease the required injection amount.

* * * * *